March 12, 1963  H. E. AMERO  3,080,861
PORTABLE, FOLDABLE, SELF-HEATING SKILLET
Filed Oct. 21, 1960  2 Sheets-Sheet 1
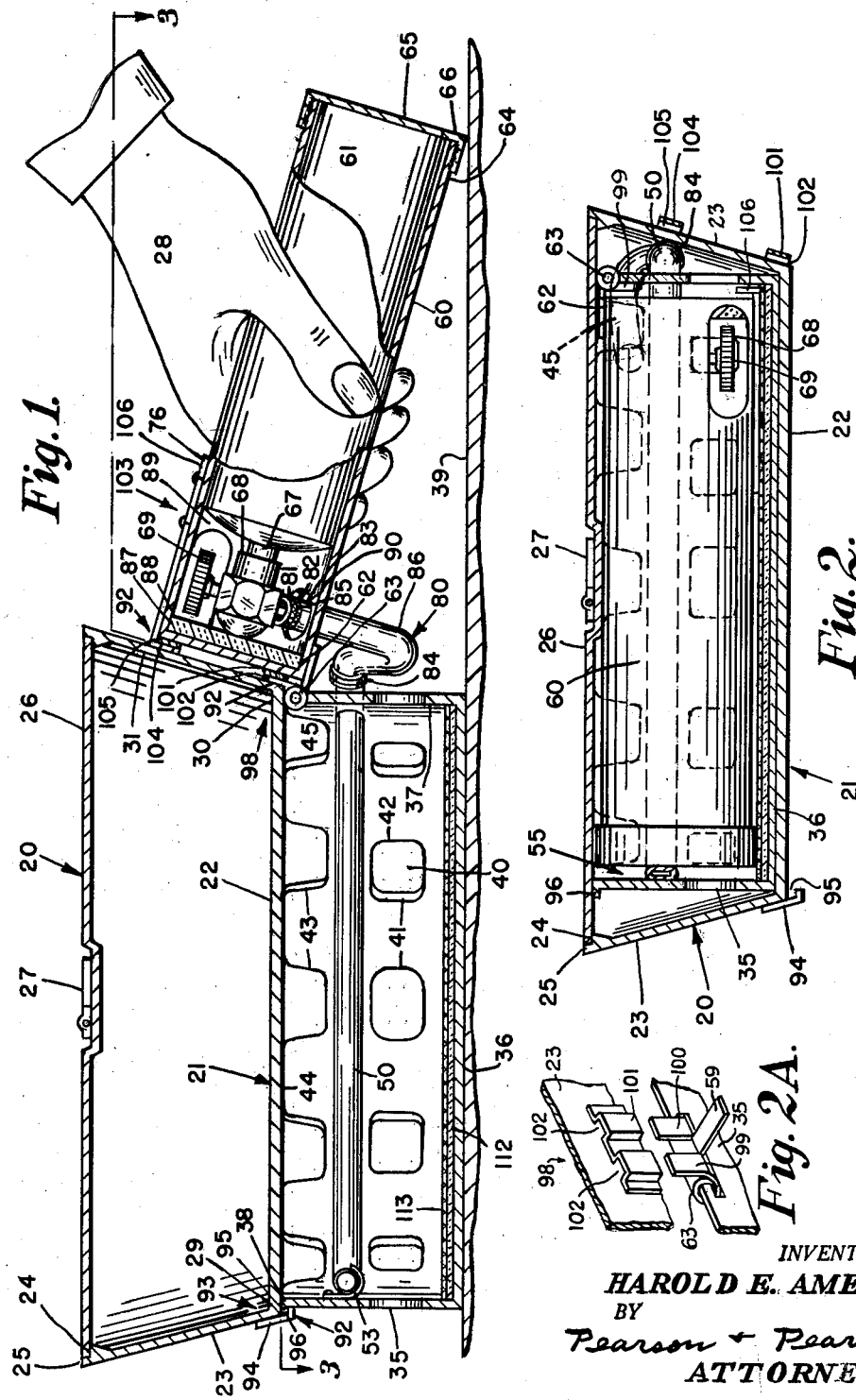
INVENTOR.
HAROLD E. AMERO
BY
Pearson + Pearson
ATTORNEYS

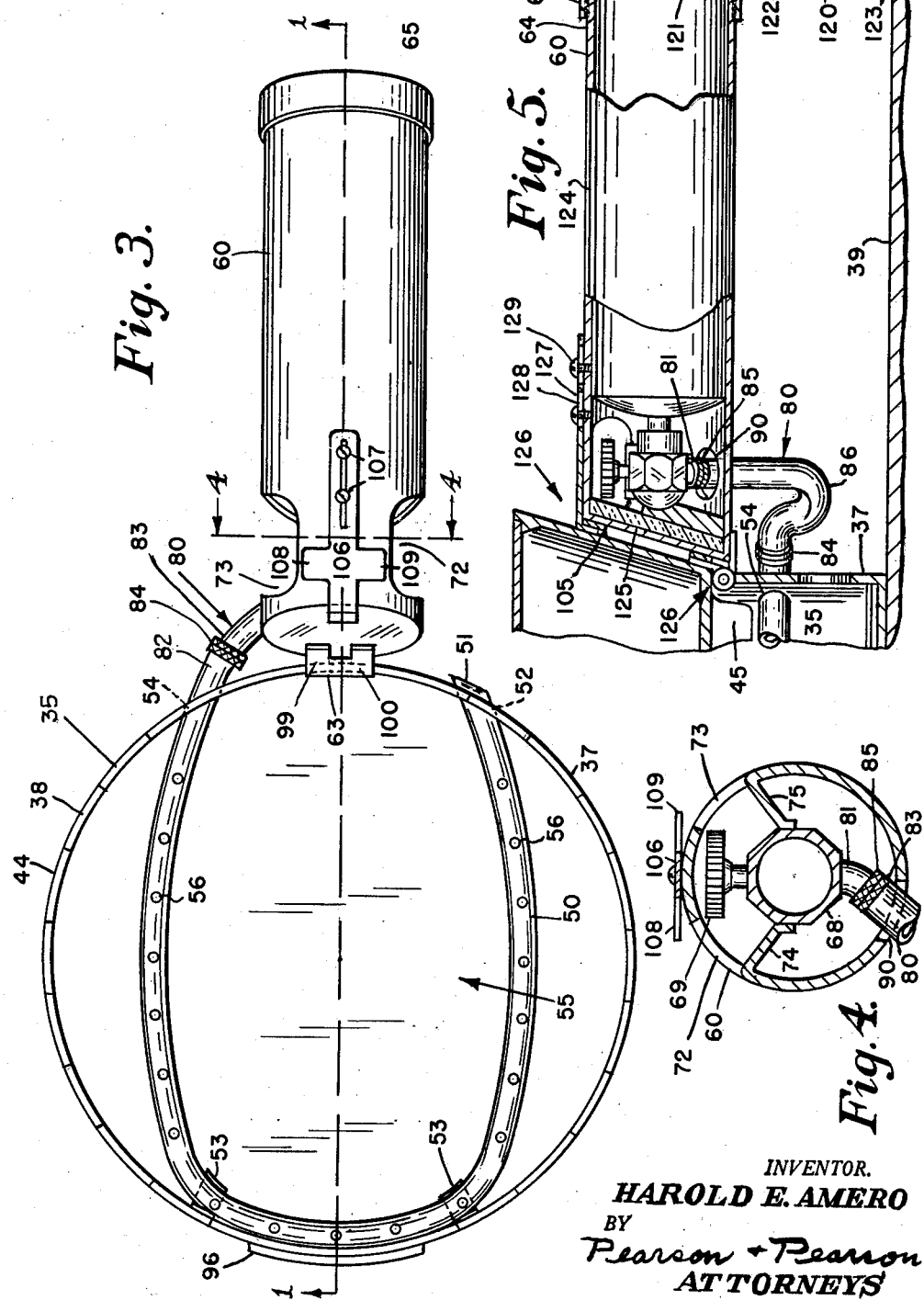

3,080,861
PORTABLE, FOLDABLE, SELF-HEATING SKILLET
Harold E. Amero, 100 Portland St., Rochester, N.H.
Filed Oct. 21, 1960, Ser. No. 63,999
15 Claims. (Cl. 126—38)

This invention relates to a portable, self heating skillet, foldable into a compact package for use by campers and the like.

I am aware that various types of portable stoves have been proposed heretofore for supporting cooking receptacles, such devices usually being enclosed in a carrying case.

However, the object of this invention is to provide a skillet in which the cooking receptacle is also the carrying case with the stove portion foldable thereinto in inoperative position.

Another object of the invention is to provide a self heating, foldable skillet with a replaceable, gas fuel cartridge in the hollow handle thereof, the handle supporting the cartridge in inclined position relative to the burner of the skillet.

A further object of the invention is to provide a self heating skillet having a pan, a base burner and a fuel supply in the handle, the pan being detachable from the remainder of the skillet for washing purposes.

Still another object of the invention is to provide a simple, rugged skillet having a self contained fuel supply of liquid propane, all of the parts fitting within the cooking pan of the skillet for occupying minimum space in the gear of a camper.

A still further object of the invention is to provide a relatively small skillet, self heated by replaceable pressurized gas cartridges and foldable into the cooking pan of the skillet, whereby the device can be slipped into a pocket of a soldier, sportsman or traveller and opened for cooking whenever desired.

Other objects and advantages of the invention will be apparent from the claims, the description of the drawings and from the drawings in which:

FIG. 1 is a side elevation, in section, of a skillet constructed in accordance with the invention in operative, unfolded position.

FIG. 2 is a view similar to FIG. 1, and showing the device in inoperative, folded position as a compact package.

FIG. 2A is an enlarged, fragmentary, detail view in perspective with parts broken away for clarity, and showing the hinged latching mechanism connecting the handle, base and receptacle.

FIG. 3 is a plan view, in section on line 3—3, of FIG. 1.

FIG. 4 is an enlarged end view, in section on line 4—4, of FIG. 1 showing part of the latching and pivot means and the valve support means, and FIG. 5 is a fragmentary view similar to FIG. 1 showing a modification in which the handle may be at various desired angles relative to the skillet.

The portable, foldable, self heating skillet 20 of the invention includes a cooking receptacle, or pan, 21 of metal, such as aluminum and preferably of shallow, round configuration. The receptacle 21 has a flat bottom wall 22, an outwardly flared upstanding side wall 23 and an inner annular shoulder, or seat, 24 around the rim 25 thereof. A cover 26, preferably flat or only slightly curved, is friction fitted in the seat 24 so that it may be used during cooking, but may be removed by the recessed ring 27 when desired. The receptacle 21 and the cover 26 also serve as a carrying case for all of the other parts of the device, as shown in FIG. 2. As shown by the relative proportions of the hand 28 and the receptacle 21, in FIG. 1, the receptacle is preferably about seven inches in diameter and two inches in height, in order that it may fit easily into a pocket, or pack, of an outdoorsman. However, it will be obvious that it could be of squared configuration and of any desired size in the usual dimensions for skillets. For convenience in description, 29 designates the front portion of the bottom 22, 30 designates the opposite, rearward, lower portion of the wall 23 and 31 designates the rearward upper portion of the wall 23.

A hollow base 35 is provided, the base 35 preferably being of receptacle shape with a flat bottom wall 36, an upstanding apertured wall 37 and a rim 38. The dimensions of the bottom 36 and the wall 37 are such that the base 35 fits snugly within the receptacle 21 as shown in FIG. 2. When removed from the receptacle, and in receptacle-supporting position, the base 35 supports the receptacle at approximately two inches above ground, or floor level, 39, the relative heights of the walls 37 and the inside height of the receptacle, with cover in place, being approximately equal to prevent rattling. The apertures 40 in the wall 37 may be arranged in any desired pattern capable of admitting air for efficient combustion of the burner flames in the base. I prefer to provide a lower row 41 of holes 42 entirely around the lower portion of the wall 37 and to undulate the rim 38, as shown, to provide an upper row 43 of ridges 44 for supporting the receptacle 21 and at least one hollow 45 for a purpose to be disclosed hereinafter.

A burner 50 is fixed within the base 35 and comprises a hollow tube looped from a closed end 51, supported in a hole 52 in wall 37, across the base to supports 53 and thence back across the base to a hole 54 in wall 37, the loop defining an elongated space 55 capable of accommodating the infolded handle of the skillet. Suitable fuel apertures 56 are provided in the burner 50 for emitting pressurized gas such as propane, butane or the like and the burner 50 is mounted at such height in the base 35 as will provide the maximum combustion efficiency for the particular gaseous fuel used.

The skillet 20 includes a hollow, tubular handle 60, preferably of circular cross section and capable of slidably receiving a cylindrical fuel cartridge 61. Fuel cartridges such as 61 are commercially available for camp stoves, blow torches and the like and vary in size from the small butane type used for cigarette lighters to relatively heavy propane tanks six to twelve inches in length. The cartridge 61, shown herein, is preferably the equivalent of the tank used in the "Bernz-O-Matic" propane torch made by the Otto Bernz Co., Inc., Rochester, New York. If preferred, the proportions of the skillet 20 could be further reduced by the use of a "Butron" cartridge such as made by the Ronson Corporation, Woodbridge, New Jersey. While pressurized gas is preferred as a fuel in the device of this invention, it will be obvious that other fuels may be used without departing from the spirit of the invention. The lower front end 62, of handle 60 is pivoted at 63 to the rim 38 of base 35 for swinging from the skillet handle position, shown in FIGURES 1 and 3, to the folded position within space 55 of base 35, shown in FIGURE 2. The opposite, free terminal end 64 of handle 60 is threaded to receive an end cap 65 for the insertion and removal of cartridge 61. When the cartridge 61 is of liquid propane, the lower rearward portion 66 of handle 60 is supported at floor, or ground level 39 because of the weight of the cartridge and to raise the level of the discharge end 67, of the cartridge 61. A suitable fuel supply control valve 68 is mounted on the discharge end 67, within handle 60. The valve includes a knurled knob 69 which is accessible for turning through the side wall apertures 72 and 73. Preferably apertures 72 and 73 are formed by bending inwardly the ears 74 and 75 whereby the latter hold the valve 68 from turning around the axis of the handle, but permit the cartridge and valve to be slid out of the handle for replacement of the cartridge. The fuel supply means 76 of the invention includes the replaceable cartridge 61 and the control valve 68. It may also include an integral safety relief valve such as the type B100 made by Fisher Governor Company of Marshalltown, Iowa and pressure reducing means for reducing pressure at the jet apertures 56.

Flexible tube means 80 is provided to connect the discharge nipple 81 of valve 68 to the end 82 of the burner 50. Preferably the means 80 is a flexible tube connector 83 such as made by Selwyn-Pacific Company of Los Angeles, California, comprising a corrugated tube of deformable material having a coupling 84 and 85 at each opposite end thereof. The flexible tube means 80 is of sufficient length to permit the handle 60 to be pivoted inwardly into inoperative position within base 35, with the intermediate portion 86 of the tube 83 received in one of the hollows 45 in the row 43 of apertures through the base wall 37. A layer of heat insulation 87 of any well known type is included in the forward portion 88 of the handle chamber 89 to cushion the cartridge and valve against rattling when tightened by the cap 65. A finger hole 90 is provided in the wall of handle 60 to permit the coupling 85 to be unthreaded for slidable removal of the cartridge 61 and valve 68.

The latching means 92 of the invention consists of tongue and slot mechanism whereby the receptacle 21 is freed for washing, or for becoming the carrying case, and the handle 60 is foldable into the space 55 in burner 50, when a single tongue is released from its slot. First tongue and slot mechanism 93 is located at the lower forward portion 29 of the receptacle 21. As shown, an arcuate element 94 is fixed to receptacle 21 to form a slot 95 and an arcuate rim section on base 35 forms a tongue 96 sliding horizontally into the slot 95. The second tongue and slot mechanism 98 is located at the opposite, rearward lower portion 30 of the receptacle wall 23, there being a pair of upstanding tongue elements 99 and 100, on each opposite end of the hinge pivot 63 of handle 60 and a corresponding element 101 forming a pair of slots such as 102 each for one of the tongues mounted on the wall 23. The tongue elements 99 and 100, as shown in FIG. 2A, are integral with the hinge pivot 63 and a tab 59 is also integral therewith for attachment to the lower, front end 62 of handle 60 by any convenient means such as welding. The third tongue and slot means 103 includes an element 104 on the upper portion 31 of wall 23, having a tongue slot 105 and a locking tongue 106 on the top of handle 60. Preferably the locking tongue 106 is of resilient flexible metal, and fixed to the handle 60 by screws 107 at one end with the tongue end spring loaded downwardly into slot 105 but liftable manually by the integral wings 108 and 109 to release the parts.

The bottom 36 of the base 35 is preferably covered with a layer of heat insulation material 112, and the layer 112 is covered with a layer 113 of reflective material such as aluminum foil to reflect heat upwardly while assuring that the base 35 will not scorch a table or other support upon which it is resting.

The folded skillet 20, as shown in FIG. 2, forms a compact package only as large as the receptacle 21. In operation the cover 26 is removed, the burner 35 removed and the handle 60 outfolded to skillet handle position. The tongue 96 is then slid into slot 95 horizontally, the tongues 99 and 100 slid vertically into their respective slots 102, the wings 108 and 109 lifted and the tongue 106 allowed to snap downwardly into its slot 105. The valve knob 69 may then be turned to discharge gas through apertures 56 which are near enough to the hollows 45 to permit the insertion of a match. Alternatively, of course, the apertures 56 may be ignited before latching the receptacle 21 into place on the burner.

A modification is shown in FIG. 5 in which a prop, or leg, 120, equal in length to the diameter of end cap 65 is pivotably mounted at its terminal end 121 to the cap 65 by a rivet 122. The prop 120 is generally triangular in outline, whereby rivet 122 is at the apex of the triangle and the flat base 123 is in engagement with the supporting surface 39 when the prop is swung downwardly as shown. The front wall of the handle 124, corresponding to handle 60, is inclined as at 125 to permit the handle 124 to be horizontal as shown. The latching means 126, corresponding to latching means 92, remains the same except that the locking tongue 127 includes slots 128 slidable on machine screws 129 whereby it may lock the handle 124 in the horizontal position shown or in the inclined position shown in FIG. 1. Locking tongue 127 is locked in either slidable position by tightening the screws 129 with a coin, screw driver or the like and, since it is of flexible metal, will conform to the slot 105 in either position.

I claim:

1. A portable, foldable, self heating skillet, said skillet comprising a receptacle for containing food to be cooked; a hollow base fitting within said receptacle, when inoperative, and having an upstanding rim for supporting said receptacle above ground level when operative, said base having air inlet means, gas outlet means and a burner fixed therewithin; a hollow, tubular handle; pivot means connecting the front bottom portion of said handle to the rim of said base for swinging said handle from a folded position, within said base, to skillet handle position outside said base; fuel supply means including a replaceable fuel container, mounted within said handle; flexible tube means connecting said fuel supply means with said burner and latching means detachably securing said base and handle to said receptacle to form a unitary operative skillet.

2. A combination as specified in claim 1 wherein said burner is looped within said base to define an elongated central space for receiving said handle in inoperative, folded position.

3. A combination as specified in claim 1 wherein said replaceable fuel container is a relatively heavy liquid propane tank and said handle inclines downwardly from the rim of said base to ground level at the free rearward bottom portion thereof.

4. A combination as specified in claim 1 wherein said base is substantially equal in outside height to the inside height of said receptacle and the rim of said base is undulated for admitting air to said burner in operative position and receiving said flexible tube in inoperative, folded position.

5. A combination as specified in claim 1 wherein said base is a receptacle with a bottom and an upstanding, perforated wall terminating in said rim and said bottom includes means for reflecting heat upwardly toward said burner.

6. A combination as specified in claim 1 wherein said latching means includes first tongue and slot mechanism slidably connecting the front of said base to the front of the bottom of said receptacle, second tongue and slot mechanism slidably connecting the rear of said base to the bottom portion of the rear wall of said receptacle and third tongue and slot mechanism slidably connecting the front upper portion of said handle to the upper portion of the rear wall of said receptacle, the tongue of said third tongue and slot means being manually releasable from the slot thereof.

7. A combination as specified in claim 1 wherein said fuel supply means includes a control valve within said handle between said fuel container and said flexible tube and said handle includes a pair of elongated apertures in the wall thereof for enabling the manual control of said valve.

8. A portable, foldable, self heating skillet, said skillet comprising a cooking receptacle; a receptacle-supporting base adapted to fit within said receptacle, said base having air inlet means and gas outlet means and having a gas burner fixed therewithin; a hollow skillet handle; pivot means connecting said handle to said base for folding therewithin, said handle containing a gas fuel cartridge; latching means for detachably connecting said base to the bottom of said receptacle and said handle to the side of said receptacle; a fuel control valve mounted within said handle and detachably connected to said cartridge, and a flexible tube connecting said valve to said burner, said tube flexing to permit said handle to be folded within said base and said base to be nested within said receptacle.

9. A combination as specified in claim 8 plus a cap threadedly mounted on the free rearward end of said handle and compressible heat insulation within the forward end of said handle for yieldably fixing said cartridge and valve therebetween against longitudinal movement.

10. A combination as specified in claim 8 plus a flat cover detachably mounted in a peripheral cover seat extending around the rim of said receptacle, said cover engaging said base and handle when folded to retain the same within said receptacle.

11. A combination as specified in claim 8 plus a pair of ears bent inwardly toward each other from the material of said handle opposite said fuel control valve for retaining said valve against turning around the longitudinal axis of said handle.

12. A combination as specified in claim 6 wherein said latching means includes mechanism for slidably adjusting said third tongue relative to said handle and to said third slot whereby said handle may be locked at various desired operative angles relative to said receptacle.

13. A combination as specified in claim 1 plus a prop pivotally mounted on the free terminal end of said handle for turning from a folded position flatwise thereagainst to an unfolded position in downward extension thereof.

14. A portable, foldable, self heating skillet, said skillet comprising a receptacle for containing food to be cooked; a hollow base fitting within said receptacle, when inoperative, said base having an apertured side wall terminating in an upper rim adapted to support said receptacle in cooking position when operative; a hollow tubular handle; pivot means connecting the forward, lower portion of said handle to the rim of said base for swinging said handle from a folded position within said base to skillet handle position outside said base; heating means within said base for heating said receptacle and latching means on said receptacle, base and handle for detachably securing said base and handle to said receptacle to form a unitary, operative skillet.

15. A portable, foldable, self heating skillet comprising a receptacle for containing food to be cooked; a hollow base fitting within said receptacle, said base having a side wall with air inlet and gas outlet apertures therein, a gas burner mounted peripherally therewithin and an upper rim adapted to support said receptacle in cooking position; a hollow, tubular handle adapted to contain a replaceable gas fuel container; pivot means connecting said handle and base for swinging said handle into and out of said base; a flexible tube adapted to connect the said burner in said base to the fuel container in said handle and means for affixing said handle at a predetermined angular relation to said base for serving as a skillet handle.

References Cited in the file of this patent
UNITED STATES PATENTS

| | | |
|---|---|---|
| 1,028,901 | Nelson | June 11, 1912 |
| 1,611,904 | Goldberg et al. | Dec. 28, 1926 |
| 2,954,024 | Webster | Sept. 27, 1960 |